Figure 1:
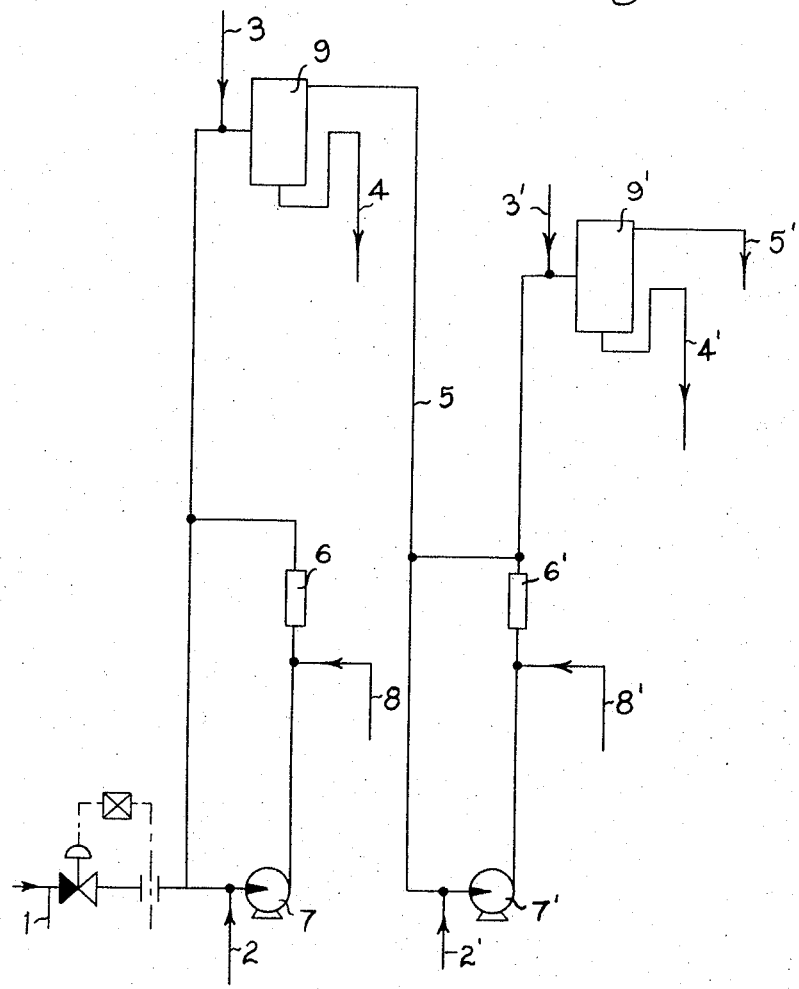

3,366,617
PROCESS FOR THE TREATMENT OF LOW-PRESSURE POLYOLEFINE DISPERSIONS
Hermann Amrehn and Oswald Wolff, Marl, Hans Bessing, Haltern, and Hanns Strache, Marl, Germany, assignors to Chemische Werke Huls Aktiengesellschaft, Kreis Recklinghausen, Germany, a corporation of Germany
Filed May 18, 1964, Ser. No. 368,086
Claims priority, application Germany, June 4, 1963, C 30,111; Dec. 31, 1963, C 31,791
2 Claims. (Cl. 260—94.9)

The production of polyolefines from ethylene and/or propylene with or without other olefinic hydrocarbons by the so-called low pressure process is as is well known, carried out in inert solvents with the exclusion of air and moisture and under the influence of complex catalysts. The complex catalysts generally used are reaction products of reducible compounds of metals of sub groups IV–VI and VIII of the Periodic System of Mendeleeff on the one hand and hydrides or metalloorganic compounds of metals of main groups I–III of said periodic system on the other hand. Commonly a tetravalent titanium compound such as titanium tetra chloride or halogen-orthotitanic acid ester is mixed with a metalloorganic aluminium compound such as aluminium triethyl, aluminium diethylmonochloride or aluminium sesquichloride.

The polymerizate or polymer which precipitates in finely divided form must be freed of adhering or occluded catalyst residue by several process steps. It has been proposed for instance to treat polyolefine dispersions with water-free alcohols and to wash the precipitated polymer with alcohol and then with acetone. In order to save alcohol it has been proposed to treat the dispersion with from 0.3 to 5% of an alcohol containing from 3 to 5 carbon atoms and then to wash with an aqueous or alcoholic alkaline medium. It has further been proposed to use additives of wetting and emulsifying agents.

Generally alcohols must be used which have not only a certain solubility in the aqueous phase but also are readily soluble in the organic dispersion medium. Thus solely by a number of washing operations polymer products are obtained that have sufficiently low ash contents. Especially for catalysts which are obtained from the difficultly saponifiable halogen-ortho-titanic acid esters the quenching of the catalyst requires the use of expensive apparatus and relatively large amounts of alcohol at elevated temperatures. The polymer then is separated from the major quantity of the decomposed catalyst, reslurried, washed, reseparated etc.

There is a technical and economical interest in a process that removes difficult decomposable catalyst residues reliably and substantially completely from low pressure polyolefine dispersions by the use of only a small amount of alcohol. It is an object of the invention to show that low pressure polyolefine dispersions that have been made by the use of complex catalysts of reducible compounds of metals of sub groups IV to VI and VIII of the Periodic System of Mendeleeff and hydrides or metalloorganic compounds of metals of main groups I to III of said periodic system can be processed especially advantageously if the dispersion, mixed with the catalyst decomposing agent and/or the washing liquid is subjected to the acoustic and radiation pressure forces of ultrasonic waves.

The process can be used to great advantage for the removal of the complex catalysts known as Ziegler catalysts.

The method has proved to be useful for freeing polymers from the catalyst residues of tetravalent titanium compounds such as titanium tetrachloride and aluminium organic compounds and exhibits an outstanding effectiveness with respect to mixed catalysts obtained from halogen orthotitanic acid esters.

Magnetostrictive or piezoelectric ultrasonic generators as well as ultrasonic whistles operated with fluid having a power of 1000 to 3000 watts per ton of solid can be used. The ultrasonic transducer is built into a pipe or container. The acoustic wave intensity suitably is within the range from 1 to 10 watts/cm.[2]. The setup transducer-pipe or container is advantageously so arranged that the maximum acoustic energy is absorbed by the suspension. The supersonant has been found to be effective in the frequency range from 8 kc.p.s. to 8 mega-c.p.s. Processing of the polymer suspension may be performed in the following ways:

(a) Quenching of the catalyst by adding of an alcohol and treating the mixture with ultrasonic waves; the further processing being performed in the usual way by separating the polymer from the liquid reslurrying the polymer with alcohol or a mixture of alcohol and water, separating again, washing and drying. A further advantage of this invention is, that pure water without any additives or detergents effectively can be used for quenching and washing.

(b) Quenching of the catalyst in the usual way at elevated temperatures by adding an alcohol, cooling the mixture, adding water if necessary, separating the mixture into two phases in a settler, mixing the polymer-hydrocarbon suspension with water or a mixture of water and alcohol, subject this mixture to ultrasonic waves, by this treatment the last catalyst residue are removed. After separation of the washing liquid and the hydrocarbon-solvent, the polymer is dried. It is especially advantageous to apply the ultrasonic treatment for quenching and washing. It has been shown that within the above mentioned frequency range the frequencies between 20 kc.p.s. and 1.55 mega-c.p.s. are especially effective for the quenching whereas a frequency within the range from 8 kc.p.s. to 1.5 mega-c.p.s. is most effective for washing. The optimum residence time in the ultrasonic field is within the range from 0.1 to 10 seconds and preferably from 0.1 to 0.3 second depending on the one hand upon the intensity and dimension of the ultrasonic field and on the other hand upon the temperature of the dispersion. At higher temperatures the throughput through the ultrasonic wave field can be increased. The preferred procedure is to mix the dispersion at a temperature of 20–80° C. preferably 40–70° C. with 0.1 to 10% and preferably from 1 to 6% of methanol or water, subject the resulting mixture to the ultrasonic field for 0.5 second and finally separate the alcohol and/or water containing most of the catalyst residue in a settler. By using alcohol only the separation can be facilitated by an addition of water before the separation. Finally the hydrocarbonpolyolefine phase is mixed with 1–20% preferably 5–10% of water, the mixture is heated to 20–70° C., preferably 30–50° C., subjected again to ultrasonic treatment (residence time 0.5 second) and separated from the wash water in a settler. Thus by filtration, separation, or decantation in known manner the purified polyolefine can be recovered.

The known agents such as water and especially alcohols may be used for the decomposition of the catalyst. It is especially advantageous to use such alcohols as are water soluble but which are insoluble or only sparingly soluble in the hydrocarbon used as the dispersion medium at all temperatures below 40° C. e.g. methanol or ethylene glycol. In order to reduce the hydrocarbon solubility of these and other alcohols such as ethanol and i-propanol it is feasible to operate in the presence of water.

The process permits the extensive removal of difficultly decomposable catalysts from low pressure polyolefine dispersions without noteworthy use of expensive raw materials such as pure alcohols or necessitating expensive recovery operations. Since the quenching of the catalyst is accomplished without dissolving the decomposing agent in the dispersion medium the processing of the added liquids is quite simple. The dispersing medium, aside from small amounts of wax (0.05–0.2%) does not contain any impurities and can be recovered for reuse by a simple distillation.

Figure 2:
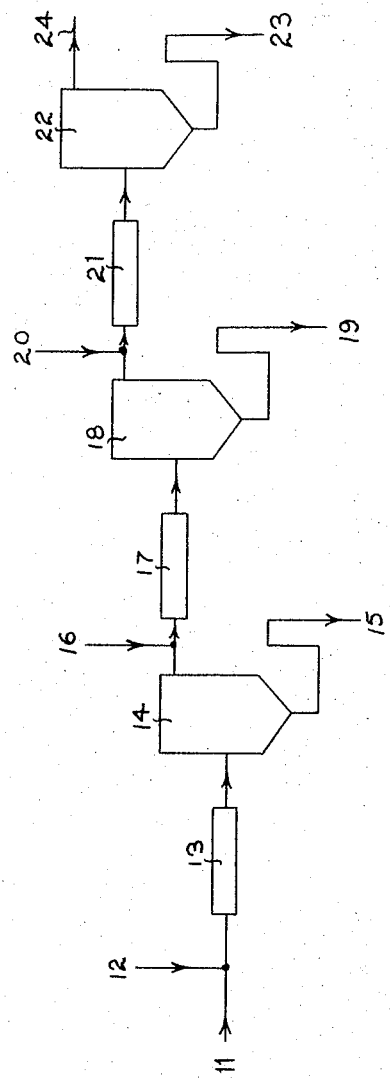

Apparatus for carrying out the process is illustrated in the accompanying drawings in which:

FIG. 1 is a flow sheet of apparatus for carrying out the process described in Example 1, and FIG. 2 is a flow sheet of apparatus suitable for carrying out the process described in Example 2.

*Example 1*

In the apparatus illustrated in FIG. 1 the crude polyolefine dispersion enters at 1 and is mixed with a readily water soluble alcohol or a water solution thereof at 2 and also if necessary at 8 and is pumped by the pump 7 through a pipe with same transducers 6. If necessary after an addition of water at 3 the mixture is separated in the settler 9 and alcohol containing water and dissolved catalyst residue is withdrawn at 4. The partially purified polyolefine separated in settler 9 passes by way of 5 to a similar washing operation bearing the reference numerals 2' to 9' respectively and in this washing operation principally water with a little alcohol if desired is introduced at 2', 3' and 8'. The resulting purified polyolefine dispersion is discharged from the settler 9' through the outlet 5' and may be delivered to a centrifuge (not shown).

In the above described procedure 1.16 m.³ per hour of a polyolefine dispersion produced by the polymerization of 160 kg. of ethylene in 1 m.³ of hexane at 60–65° C. with a catalyst consisting of 2.6 kg. of dichloro-dialkoxy-titanate and 2.4 kg. of aluminium sesquichloride is introduced at 1. At 2, at a temperature of 50° C., 50 l. of methanol is introduced and the resulting mixture is delivered by the pump 7 to the ultrasonic unit 6 and subjected therein for 1 second at 1 mega-c.p.s. with a power output of 100 watts/hour. 50 l. of water is then added at 3 and the mixture is delivered into the settler 9 where the polyolefine dispersion is separated from alcohol and water which contains about 90% of the catalyst. The separated alcohol and water is discharged at 4. The partially purified polyethylene dispersion is then mixed with an additional 50 l. of water at 50° C. and the resulting mixture is again treated for 1 second at 20 kc.p.s. with a power output of 200 watts/hour in a second ultrasonic unit 6'. The polyolefine dispersion is again separated from water in a second settler 9' and the pure dispersion is discharged at 5', suction filtered and dried. The ash content of the product is 100 parts per million and the chlorine content is 40 parts per million.

*Example 2*

In the apparatus illustrated in FIG. 2 a polyolefine dispersion made as described in Example 1 is introduced at 11, 1–10% of methanol and/or water is introduced at 12 and the mixture is passed through an ultrasonic apparatus 13. The frequency is 1 mega-c.p.s. The residence time of the dispersion in the ultrasonic field was between 0.1 and 10 seconds and the necessary power output was 1000–3000 watts per ton of solid. The dispersion then flows after the ultrasonic treatment to a settler 14 in which the dispersion is separated from the methanol-water phase containing the catalyst. The methanol-water phase is discharged continuously through an outlet 15. The separated dispersion flows from the top of the settler 14. Wash water (10%) containing sufficient alkali to neutralize the acid in the dispersion is introduced at 16 and the resulting mixture is delivered through a second ultrasonic apparatus 17 to a second settler 18 from which the washing liquid phase is withdrawn through the pipe 19. The dispersion phase flows from the top of the settler 18 and may if necessary be subjected to a further washing treatment as indicated by the steps 20–24.

A low pressure polyethylene dispersion containing from 800–850 kg. of polyethylene and 3000–5000 p.p.m. of non-organically bound chlorine and 5 tons of hexane are treated per hour. The dispersion at a temperature of 40–60° C. together with 250 kg./h. of alcohol is delivered to the ultrasonic apparatus. The ultrasonic apparatus 13 conduits of a pipe 125 mm. in diameter and 2000 mm. long to the front side of which is attached a piezoelectric transducer having a sonic power emitting surface of 7850 mm.². The frequency is 1 mega c.p.s. and the power output 1000 watts. The polyolefine dispersion separated in the settler 14 has a chlorine content of 210 p.p.m. 800 kg./h. of water and 10 l./h. of 10% sodium hydroxide were added to the dispersion at 16. The vibration apparatus 17 consists of a pipe 300 mm. in diameter and 1000 mm. long having six magnetostrictive transducers arranged around the circumference and opposite to each other, each with a transducer of 105 x 210 mm. The frequency was 20 kc.p.s. and the total power output 1000 watts. The polyolefine separated in the vessel 18 had a chlorine content of 80 p.p.m.

The above described embodiment of the invention has the advantage of very simple operation free of any circulating pumps subject to the corrosive action of the acid decomposition products of the catalyst. Here also the dispersion is passed only once through the ultrasonic field while in Example 1 the desired average residence time is accomplished by circulating the dispersion.

We claim:

1. Process of working up a low pressure polyolefine dispersion made by polymerization of an olefine in the presence of a complex catalyst consisting of a reducible compound of a metal of sub groups IV to VI and VIII of the Periodic System of Mendeleeff and a compound selected from the group consisting of the hydrides and metalloorganic compounds of the metals of main groups I to III of said periodic system which comprises subjecting the dispersion in the presence of at least one agent selected from the group consisting of catalyst decomposing agents and washing agents to ultrasonic waves in the frequency range from 8 kc.p.s. to 8 mega-c.p.s. and having an acoustic wave intensity within the range of from about 1 to about 10 watts per square centimeter.

2. Process as defined in claim 1 in which the dispersion, prior to supersonic treatment thereof, and at a temperature within the range from 20 to 80° C. is mixed with from 0.1 to 10% by weight, based upon the weight of the dispersion medium content of the dispersion, of an agent selected from the group consisting of readily water soluble alcohols, mixtures of readily water soluble alcohols with water and water alone, the resulting mixture is first subjected to the action of an ultrasonic field at a frequency within the range from 20 kc.p.s. to 1.5 mega-c.p.s., said agent is separated from the dispersion, the resulting separated dispersion is mixed with 5 to 20% by weight of water, the resulting mixture is subjected to the action of an ultrasonic field at a frequency within the range from 8 kc.p.s. to 1.5 mega-c.p.s. and the water and dispersion medium are separated from the resulting mixture.

References Cited

UNITED STATES PATENTS

| | | | |
|---|---|---|---|
| 3,222,231 | 12/1965 | Markels et al. | 204—150 |
| 2,912,420 | 11/1959 | Thomas | 260—949 |
| 2,962,488 | 11/1960 | Horne | 260—949 |
| 3,087,840 | 4/1963 | Shaw | 204—158 |
| 3,098,845 | 7/1963 | Cull et al. | 260—94.9 |

JOSEPH L. SCHOFER, *Primary Examiner.*

L. EDELMAN, *Assistant Examiner.*